(12) United States Patent
Zhao

(10) Patent No.: US 8,341,706 B2
(45) Date of Patent: Dec. 25, 2012

(54) METHOD OF PROCESSING AUTHORIZATION MESSAGES DESTINED FOR A PLURALITY OF MOBILE RECEIVERS AND METHOD OF TRANSMITTING SUCH MESSAGES

(75) Inventor: Yishan Zhao, Antony (FR)

(73) Assignee: Nagra France SAS, Paris (FR)

( * ) Notice: Subject to any disclaimer, the term of this patent is extended or adjusted under 35 U.S.C. 154(b) by 1076 days.

(21) Appl. No.: 12/095,288

(22) PCT Filed: Nov. 28, 2006

(86) PCT No.: PCT/EP2006/068974
§ 371 (c)(1),
(2), (4) Date: Jun. 11, 2008

(87) PCT Pub. No.: WO2007/063056
PCT Pub. Date: Jun. 7, 2007

(65) Prior Publication Data
US 2009/0019529 A1    Jan. 15, 2009

(30) Foreign Application Priority Data
Nov. 30, 2005    (EP) ..................................... 05292545

(51) Int. Cl.
*G06F 21/00*    (2006.01)
(52) U.S. Cl. ......................................................... 726/4
(58) Field of Classification Search .................. 726/3–4, 726/17
See application file for complete search history.

(56) References Cited

U.S. PATENT DOCUMENTS

| | | | | |
|---|---|---|---|---|
| 6,308,218 | B1 * | 10/2001 | Vasa ............................... | 709/238 |
| 6,449,491 | B1 * | 9/2002 | Dailey .......................... | 455/518 |
| 6,584,199 | B1 | 6/2003 | Kim et al. | |
| 7,219,249 | B1 * | 5/2007 | Ghose et al. ................... | 713/324 |
| 2003/0147531 | A1 * | 8/2003 | Sasselli et al. ................ | 380/210 |
| 2004/0153419 | A1 * | 8/2004 | Wary et al. ..................... | 705/71 |
| 2005/0108763 | A1 * | 5/2005 | Baran et al. ..................... | 725/87 |
| 2006/0123467 | A1 * | 6/2006 | Kumar et al. ..................... | 726/3 |

FOREIGN PATENT DOCUMENTS

| | | |
|---|---|---|
| EP | 0975109 | 1/2000 |
| WO | 2005/091635 | 9/2005 |

OTHER PUBLICATIONS

"Functional Model of a Conditional Access System," EBU Review-Technical, European Broadcasting Union, pp. 64-77, No. 266, Brussels, BE., 1995.

* cited by examiner

*Primary Examiner* — Brandon Hoffman
*Assistant Examiner* — Anthony Brown
(74) *Attorney, Agent, or Firm* — DLA Piper LLP US

(57) ABSTRACT

A method of transmitting authorization messages to a plurality of mobile receivers comprises the steps of defining at least one set of authorization messages, a first part of which, forming a first message category, is intended for a first group of mobile receivers, a second part of which, forming a second message category, is intended for a second group of mobile receivers; creating a first authorization message packet containing at least the first part of the set of authorization messages; creating a second authorization message packet containing at least the second part of the set of authorization messages; transmitting the first authorization message packet over a first service, without previously sending information indicating to which mobile receivers the message packets are directed; and transmitting the second authorization message packet over a second service without previously sending information indicating to which mobile receivers the message packets are directed.

23 Claims, 2 Drawing Sheets

METHOD OF PROCESSING AUTHORIZATION MESSAGES DESTINED FOR A PLURALITY OF MOBILE RECEIVERS AND METHOD OF TRANSMITTING SUCH MESSAGES

TECHNICAL FIELD

The present invention is generally related to the transmission of contents to mobile receivers. These contents can, in particular, but not exclusively, be pay-television events, audio contents, games, software or information such as weather forecasts, stock exchange information or other similar information. This invention also concerns the processing of these messages.

The concerned receivers can in particular be mobile phones, personal digital assistants (PDA), portable computers (laptops), receivers destined for being placed in vehicles or any mobile receiver developed for an application that uses the above-indicated contents.

More in detail, the invention refers to a method for transmitting authorization messages intended for a plurality of mobile receivers, as well as to a method for processing transmitted messages according to this method.

BACKGROUND ART

In the field of the broadcasting of contents as defined above and in particular of television contents with conditional access destined to mobile receivers, known with the acronym DVB-H (Digital Video Broadcast-Handheld), the contents are sent in a cyclic way in the form of packets (known as Time Slices). The packets correspond to services. A service can be defined as one or more digital streams forming a subset of the global digital stream. This subset shares a common identifier so as to be able to create an event starting from this identifier.

The rights and other controls are sent in the form of authorization messages also in the form of packets. These packets of authorization messages are considered as a specific service and are therefore sent in the form of service data.

In a broadcast environment, each authorization message is repetitively broadcast in order to be able to effectively reach its receiver. When the number of subscribers or users is high, the number of messages to be broadcast is likewise. The packet of each cycle containing these messages can occupy a considerable broadband. In practice, the number of authorization messages intended for each receiver is relatively low. Nonetheless, all the receivers receive the packet containing the authorization messages and process them in order to establish if these messages relate to them or not.

When using mobile receivers working with batteries, the energy consumption problem is particularly important. Actually, in order to ensure the receiver's maximum autonomy, it is useful to try to reduce the energy consumption to a minimum. For this reason, it is therefore essential to process as little useless information as possible.

In the prior art systems, the authorization messages, containing in particular access rights to events or keys which allow for the decryption of encrypted information, are sent to all the receivers which have access to the concerned services. Among this set of receivers, each authorization message is actually intended for a low number of receivers. These must however process these authorization messages, in particular they must receive and decrypt them if necessary, before being able to establish whether the receivers are really concerned or not.

This implies that the receiver must be in active mode at the moment of the reception of the packet of authorization messages and that it must consume energy for receiving and processing messages that maybe do not concern it. Energy is therefore often wasted, which can considerably reduce the autonomy of the mobile receiver.

The application EP 0 975 109 describes a method for broadcasting digital content to receivers, in which these receivers are started only when a content is intended for them. To realize this, the method involves the preliminary sending of information tables to each receiver. These information tables involve an indication of a type of transmitted information, an identifier of the receivers to which the information is intended for as well as a time interval during which the information will be broadcast.

At the reception of an information table, the receiver determines which group it belongs to and memorizes the time ranges corresponding to the broadcasting of information related to it. Then it sets itself up in standby mode and sets itself up in receiving mode only a short time before information relating to it is broadcast.

The concerned receivers are in inactive state and set themselves up in receiving state some seconds before the information intended for them is sent. This information is sent for each group of receiver for about ten minutes.

In a system using portable decoders, a duration of some seconds corresponds to a complete cycle of messages being sent. Consequently, by using the system described in the EP 0 975 109, no energy saving is possible. This method is therefore not compatible with the broadcasting on mobile receivers.

Moreover, in order for a receiver to be able to have access to the authorization messages relating to it, it is necessary for it to receive the corresponding table. In an application using in particular mobile receivers, this means that this table must be sent very frequently so that a user starting its unit in a certain moment would not have to wait for a long time before being able to receive the corresponding messages. It so follows that the receiver must be started up to obtain the table concerning it, which is in contradiction with the aim of the invention, that is, to reduce energy consumption.

DESCRIPTION OF THE INVENTION

The present invention is intended to avoid the drawbacks of the prior art methods by providing a method in which the energy is used in an optimal way, that is, a minimum quantity of energy is consumed to process the messages not concerning the receiver receiving these messages or in other words, that a maximum amount of messages processed by a receiver really concern this receiver. According to this invention, there is no preliminary sending of indications of the time at which messages will be sent. In this way, it is not necessary to use energy for the reception of such indications.

The aim of the invention is achieved by a method of processing authorization messages by a mobile receiver, characterized in that these authorization messages are transmitted in a cyclic way by message packets, these message packets including a subset of authorization messages, at least one of the packets of authorization messages being intended for said mobile receiver and at least another one of the packets being not intended for the mobile receiver, said method comprising the following steps:

reception of all the packets of authorization messages by said mobile receiver during the duration of at least one cycle;

determination of at least one group of receivers to which said mobile receiver belongs;

among the packets of authorization messages received during a cycle, determination of all the packets of authorization messages intended for the said group of receivers to which said mobile receiver belongs;

reception of at least one packet of authorization messages intended for the group of receivers to which said receiver belongs and absence of reception of at least one packet of authorization messages intended for a group of receivers to which said mobile receiver does not belong;

processing by the mobile receiver, of said messages received in the packets.

The aim of the invention is likewise achieved by a method of transmitting authorization messages destined for a plurality of mobile receivers, comprising the following steps:

definition of at least one set of authorization messages, a first part of which, forming a first message category, is intended for a first group of mobile receivers and a second part of which, forming a second message category, is intended for a second group of mobile receivers;

creation of a first packet of authorization messages containing at least the said first part of the set of authorization messages;

creation of a second packet of authorization messages containing at least the said second part of the set of authorization messages;

transmission of the said first packet of authorization messages over a first service, without previously sending information indicating the multimedia unit which message packets concern it;

transmission of the said second packet of authorization messages over a second service distinct from the said first service without previously sending information telling the multimedia unit which message packets relate to it.

The solution proposed by the present invention consists in segmenting the set of authorization messages in groups of messages of smaller size according to different criteria. A first type of criteria concerns the authorization messages and a second type of criteria concerns the receivers.

The authorization messages can be first segmented in a classic way into global, shared and individual authorization messages.

The mobile receivers are organized in several groups or categories. These categories are defined on the basis of criteria like for example the type of receiver (mobile phone, PDA, car receiver, . . . ), the identification number, a category of access rights, a mobile receiver version or the type of configuration of said receiver, etc.

The authorization messages are grouped in order to form different packets for each type of message and/or category of receivers. At the reception, the receivers filter the services in order to process only the categories of messages that may concern them.

The messages of the different groups are sent on different services, in a way similar to the different services used to transmit audio/video contents.

The management of the reception of the services does not require any preliminary sending of tables, but is carried out in a similar way to the sending of the audio/video content. This presents the advantage that the method of the invention is compatible with the short time cycles required in the applications using mobile receivers. Moreover, no energy is consumed for receiving and processing information related to the sending of subsequent messages.

BRIEF DESCRIPTION OF THE DRAWINGS

The present invention and its advantages will be better understood with reference to the enclosed drawings and to the detailed description of particular embodiments, in which.

WAYS TO CARRY OUT THE INVENTION

Figure 1:
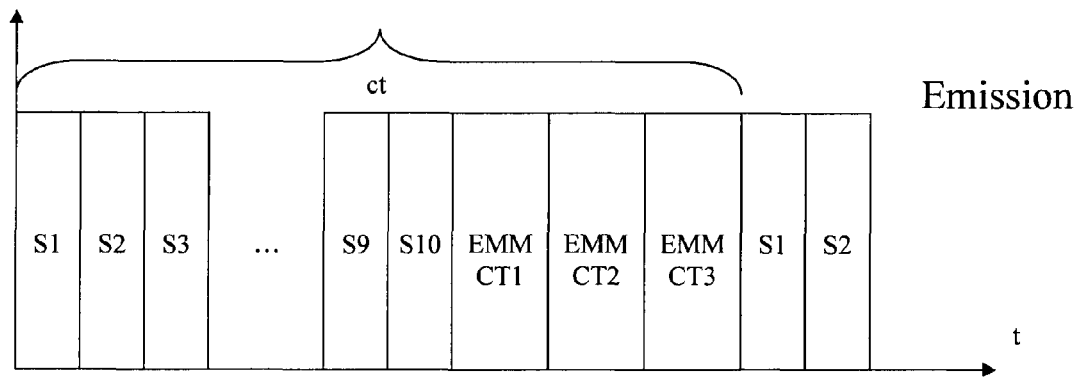
FIG. 1 illustrates the emission of data by a content supplier.

FIG. 1 illustrates the method of the invention, seen from the side of the emission of content. In the context of the invention, some contents as pay-television events, audio contents, games, softwares or information such as weather forecasts, stock exchange information or other such information are broadcast by content suppliers. In the invention, these contents are intended for mobile receivers such as mobile phones, personal digital assistants (PDA), portable computers (laptops), receivers destined for being placed in vehicles or any mobile receiver developed for an application that uses the above-indicated contents. These mobile receivers are linked to a management center that has in particular the function of managing the access rights, subscriptions, content encryption keys, etc. The content suppliers and the management center may be linked to a same entity or may be different entities.

It is well known that the contents broadcast to mobile receivers are generally not continuously broadcast, as in the case of fixed receivers, but are broadcast in the form of data packets. These packets are distributed in different services, marked with S1, . . . S10 on FIG. 1. Each packet corresponds to a channel or a service. The packets are broadcast in a cyclic way according to a cycle time generally between 2 and 5 seconds in practice. Each packet contains the amount of information corresponding to the chosen cycle time. By way of example, in the case of the broadcasting of a pay-television event, let us consider that the cycle time ct is 2 seconds. The first packet marked with S1 on FIG. 1 contains data corresponding to 2 seconds when they are displayed on the mobile receiver. After this time cycle, a second cycle re-starts by broadcasting the content linked to the service 1, and likewise containing the equivalent of 2 seconds of visualization. The transmission duration of a packet can range between about 0.1 and 0.5 seconds in practice. The cycle time and effective transmission time of each service is statically and/or dynamically settable.

Figure 2:
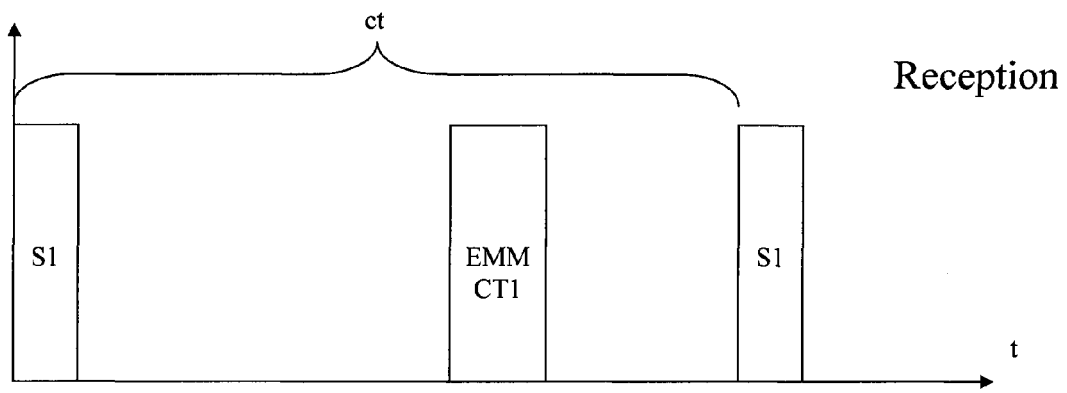
FIG. 2 illustrates the reception of data by a mobile receiver, these data being emitted as shown by FIG. 1.

FIG. 2 illustrates the reception of content by a mobile receiver. Let us consider that the receiver is fixed on the service S1. It then receives each packet linked to this service. It does not receive the other packets linked to the content of other services, so that it can be put in standby mode during the transmission of packets linked to the other services S2, . . . S10. According to a practical embodiment, this embodiment allows an energy saving of up to 90%.

In FIG. 1, in addition to the packets linked to the content, some packets linked to the authorization messages are likewise represented. These packets are marked with EMM CT1, EMM CT2 and EMM CT3. Each of these packets corresponds to a particular category of authorization message, as explained hereinafter, with reference to FIGS. 3 and 4.

Generally, the authorization messages can contain access rights to one or more particular contents, keys allowing for the contents' decryption or access means to a certain content, controls, for instance destined for the receiver, or in a broader sense, any message other than the content in the strict sense of the word.

In the method of the invention, the set of authorization messages is separated into several categories, at least two. In the embodiments illustrated with FIGS. 3 and 4, six categories are illustrated. In the example represented, the set of authorization messages is segmented into global, shared and individual messages. The global messages contain the messages that are destined for all the users connected to a management center. These global messages are marked with EMM-G in the figure. The shared messages are messages destined for a group of receivers, this group being a subset of all of the mobile receivers connected to the management center. These messages are marked with EMM-S in the figures. The individual messages are destined for a particular receiver. They are marked with EMM-U.

The set of global authorization messages is not segmented. The shared authorization messages are segmented into two parts in FIGS. 3 and 4. A first segmenting is made depending on the type of concerned mobile receiver. Among the receivers, mobile phones, receivers destined for being placed in a car or other vehicle, personal assistant type receivers or receivers specially conceived for the selected application may in particular be used.

Figure 3:
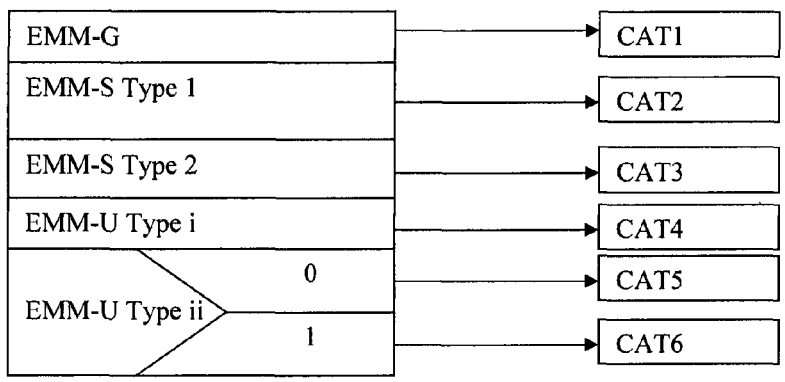
FIG. 3 represents a first embodiment of the segmentation of data in categories according to the invention.
Figure 4:
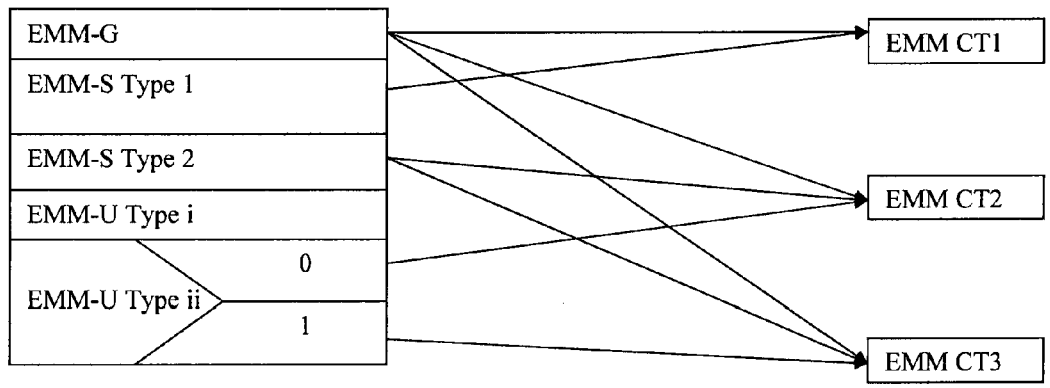
FIG. 4 represents a second embodiment of the segmentation of data in categories, similar to the one of FIG. 3.

The first subset of authorization messages, marked with EMM-S Type 1 in FIGS. 3 and 4 could for instance contain the shared authorization messages intended for mobile phones, while the subset EMM-S Type 2 could contain the shared authorization messages intended for other receivers.

The individual authorization messages are likewise divided into several categories, marked with EMM-U Type i and EMM-U Type ii. According to a concrete example, this segmenting can likewise be made on the basis of the type of mobile receiver for which the messages is intended. By way of example, let us assume that the messages of the category EMM-U Type i are destined for mobile phones and the messages of the category marked with EMM-U Type ii are those destined for the receivers which are different from mobile phones.

The subset marked with EMM-U Type ii, whose messages are destined for receivers which are different from mobile phones, is divided in two parts. This separation is based on a parameter of the concerned mobile receiver. By way of example, one of the parts could contain all the messages destined for receivers having an even identification number, this group being marked with "0" in the FIGS. 3 and 4, and the other part could contain the messages destined for receivers having an odd identification number, this group being marked with "1" on these figures. This has the advantage of separating the group into two parts, which allows for a better processing, as explained hereinafter.

Six categories are thus defined according to authorization messages types and receivers parameters.

According to the method of the invention, packets of authorization messages are afterwards defined on the basis of previously realised segmentations. In the embodiment disclosed with FIG. 3, each segment corresponds to a specific packet, marked with CAT1, CAT2, . . . , CAT6.

In the embodiment disclosed with FIG. 4, several categories are grouped to form a packet. By way of example, the first packet marked with EMM CT1 is formed by categories including the global authorization messages EMM-G and the shared authorization messages intended for mobile phones.

The second packet, marked with EMM CT2 includes the global authorization messages EMM-G, the shared authorization messages intended for mobile receivers which are different from mobile phones and the individual authorization messages for the mobile receivers which are different from mobile phones having an even identification number.

Finally, the third packet, marked with EMM CT3 includes the global authorization messages EMM-G, the shared authorization messages intended for mobile receivers which are different from mobile phones and the individual authorization messages intended for the mobile receivers which are different from mobile phones having an odd identification number.

It should be noticed that one of the above-defined segmentations, corresponding to the individual authorization messages intended for mobile phones, is not introduced in any packet, for a reason to be explained afterwards.

The particular embodiment disclosed with FIG. 4 corresponds to data sent according to the embodiment of FIG. 1. As one can see on this Figure, the categories EMM CT1, EMM CT2 and EMM CT3 previously defined are broadcast in the form of packets, as are the services. They are considered by the receiver as service data. Each authorization message packet is sent as a distinct service.

Referring to FIG. 2, which is set from the receiving side, the concerned mobile receiver is involved only with the authorization messages packet of the first category EMM CT1. It is only switched on for the reception of this packet. When the other packets are broadcast, it is in standby mode and therefore it does not receive them, which allows for substantial energy saving, as previously indicated.

Figure 5:
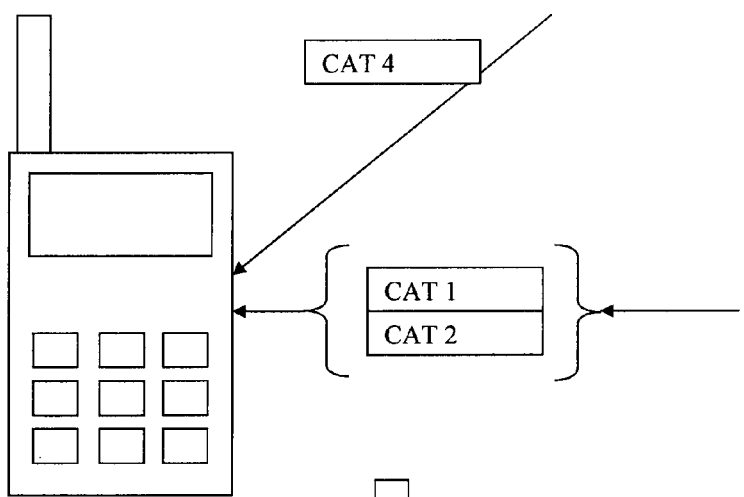
FIG. 5 schematically represents the reception of data on the basis of the categories illustrated by means of FIG. 3.

When the categories are defined as explained referring to FIG. 3, the reception and processing of information is disclosed by FIG. 5. Let us consider the case in which the considered mobile receiver is a mobile phone. In this case, it will receive first of all the global authorization messages that are destined to all of the receivers as per definition. This corresponds to the first category CAT1. It will likewise receive the shared authorization messages destined to the mobile phones, which corresponds to the second category marked with CAT2. The individual authorization messages destined to the mobile phones correspond to the fourth previously defined category, whose messages are not part of the stream in the chosen example. Each of these messages being destined to a particular receiver, they are supposed to be sent in the form of individual messages with well-known means (SMS, TEXTO) and each mobile phone receives only the individual messages that are destined for it.

The message packets are sent by category according to a clearly defined frequency and cycle. This allows the receiver to scan only the message packets that are likely to concern it. The packets that the receiver must receive can be automatically determined by the receiver or can be memorized in the receiver at the moment of the personalization of apparatus or by sending an updating message for example. A way to automatically establish which packets may concern a particular mobile receiver, consists in the scanning of all of the services during an initializing phase. Starting from the information contained in these services, the receiver memorizes which service it must receive for the future and which services it must not receive. The receivers can also automatically or manually connect to the management center servers to recover their reception configuration during the initializing phase. In this way, it is not necessary for the receivers to remain in reception mode until they have received the information related to the groups concerning them.

Figure 6:
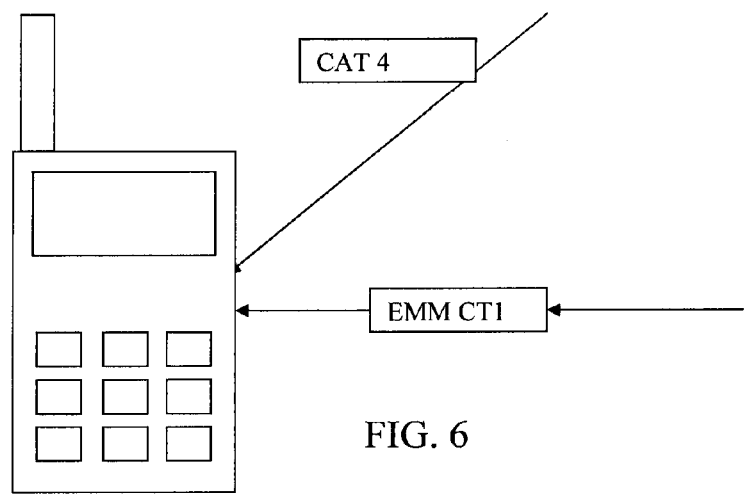
FIG. 6 represents the reception of data on the basis of the categories illustrated by means of FIG. 4.

In the embodiment disclosed by FIG. 4, the message categories are grouped in order to form specific packets. These packets are sent as disclosed by FIG. 1 and processed as indicated by FIG. 6.

Resuming the hypothesis that the receiver is a mobile phone, this receiver will have to receive, as before, the global authorization messages intended for all of the receivers as well as the authorization messages intended for the mobile phones. These messages are grouped in the first category marked with EMM CT1.

The receiver belonging to this category and having access to the service S1 will only be active when data relative to this service S1 are broadcast and when messages of the category EMM CT1 are broadcast. This corresponds to the case disclosed by FIG. 2. Out of these periods, the receiver can be set in standby mode.

The present invention is interesting because, rather than receiving all the authorization messages, the majority of which do not concern the receiver, they are segmented into categories susceptible to regard the receivers receiving the messages. Thus, significant energy saving can be achieved for the receiver that is active only during the periods in which it can be useful.

The indicated segmentations have been given by way of example. It is clear that other categories could be used for the segmentation. Instead of grouping all of the mobile receivers except mobile phones in a single category, it is, of course, possible to form categories for different kinds of existing mobile receivers.

Concerning the identification number, this number being possibly that of a physical component, of a software component or of a receiver certificate, the segmentation is based on the parity of the number in the described example. It is clear that other separations could be made, for example by modulo function, by contiguous ranges of identification numbers. In the last case, ranges are defined in such a way that there are not "too many" different categories and that each interval does not contain "too many" receivers.

Another possible segmentation concerns the categories of access rights. Actually, it is possible to separate the authorization messages according to the type of subscription, to the specific authorized channels or to other similar criteria. Another segmentation can be made on the basis of a mobile receiver version, of a security module configuration associated to the mobile receiver or of a software version used by the receiver in particular.

The invention claimed is:

1. A method of processing authorization messages by a mobile device having a receiver, the authorization messages being transmitted in a cyclic way by authorization message packets, the authorization message packets including a subset of authorization messages, at least one of the authorization message packets being intended for said mobile device and at least another one of the authorization message packets being not intended for the mobile device, said method comprising the steps of:
 receiving all of the authorization message packets by said mobile device during the duration of at least one initialization cycle, wherein one cycle contains contents corresponding to a plurality of services and at least one authorization messages packet, the contents and the authorization messages packet sent during, one cycle being different from the contents and the authorization messages packet sent during another cycle;
 determining at least one group of mobile devices having receivers to which said mobile device belongs;
 among the authorization message packets received during the at least one initialization cycle, determining by said mobile device all of the authorization message packets intended for the said group of mobile devices to which said mobile device belongs;
 determining by said mobile device at least one time interval during the at least one initialization cycle, all of the authorization message packets intended for the group of mobile devices to which said mobile device belongs being received by said mobile device during said at least one time interval;
 during at least one cycle subsequent to the at least one initialization cycle, automatically switching said receiver on during a first part corresponding to the at least one time interval determined for the at least one initialization cycle, in order to receive at least one authorization message packet intended for the group of mobile devices to which said mobile device belongs and automatically setting said receiver in standby mode during a second part in which at least one authorization message packet intended for a group of mobile devices to which said mobile device does not belong are being transmitted, and
 processing by the mobile device, said authorization messages received in the authorization message packets.

2. The method of processing authorization messages according to claim 1, wherein the mobile device receives only one authorization message packet per cycle and wherein only that packet is processed during each cycle.

3. The method of processing authorization messages according to claim 1, wherein the mobile device is set in standby mode when the packets of sent authorization messages are not part of the authorization message packets intended for said mobile device and wherein the standby mode setting is made on the basis of a time cycle and of an instant within the cycle, as of which the authorization message packets concerning said mobile device are sent.

4. A method of transmitting authorization messages destined for a plurality of mobile devices having receivers, comprising the steps of
 defining at least one set of cyclic authorization messages, a first part of which, forming a first message category, is intended for a first group of mobile receivers and a second part of which, forming a second message category, is intended for a second group of mobile devices, wherein the messages sent during one cycle are different from the messages of the same message category sent during a subsequent cycle;
 creating a first authorization message packet containing at least the said first part of the set of cyclic authorization messages;
 creating a second authorization message packet containing at least the said second part of the set of cyclic authorization messages, wherein at least one of the authorization message packets comprises at least two message categories;
 cyclically transmitting the said first authorization message packet over a first service, without previously sending information indicating to the mobile devices which message packets concern them; and
 cyclically transmitting the second authorization message packet over a second service distinct from the said first service without previously sending information indicating to the mobile devices which message packets relate to them.

5. The method of transmitting authorization messages according to claim 4, wherein the cyclical authorization messages are divided into several sets, each of the sets defining at least one category of authorization messages.

6. The method of transmitting authorization messages according to claim 5, wherein all or a part of the remaining authorization messages of a set are transmitted on at least a third service different from the first service and the second service.

7. The method of transmitting authorization messages according to claim 5, wherein the categories of authorization messages are defined on the basis of criteria linked with at least one parameter of the concerned mobile devices.

8. The method of transmitting authorization messages according to claim 7, wherein the parameter of the mobile devices is chosen among the group consisting of a type of mobile device, an identification number, a category of access rights of a mobile device, and configuration version of said mobile devices.

9. The method of transmitting authorization messages according to claim 5, wherein the categories of authorization messages are defined on the basis of criteria linked simultaneously to the authorization message type and to the parameter linked to the concerned mobile devices.

10. The method of transmitting authorization messages according to claim 7, wherein the categories of authorization messages are defined on the basis of criteria linked simultaneously to the authorization message type and to the parameter linked to the concerned mobile devices.

11. The method of transmitting authorization messages according to claim 4, wherein at least one of the authorization message packets comprise a single category of authorization messages.

12. A system for processing authorization messages by a mobile device having a receiver, the system comprising:
    a management center configured to transmit authorization messages in a cyclic manner by authorization message packets, the authorization message packets including a subset of authorization messages, at least one of the authorization message packets being intended for said mobile device and at least another one of the authorization message packets being not intended for the mobile device, and
    at least two receivers, the receivers being configured to perform the steps of
    receiving all the authorization message packets by said mobile device during the duration of at least one initialization cycle, wherein one cycle contains contents corresponding to a plurality of services and at least one authorization messages packet, the contents and the authorization messages packet sent during one cycle being different from the contents and the authorization messages packet sent during another cycle;
    determining at least one group of mobile devices having receivers to which said mobile device belongs
    among the authorization message packets received during the at least one initialization cycle, determining by said mobile device all authorization message packets intended for the group of mobile devices to which said mobile device belongs;
    determining by said mobile device a least one time interval during the at least one initialization cycle, all of the authorization message packets intended for the group of mobile devices to which said mobile device belongs being received by said mobile device during said at least one time interval;
    during at least one cycle subsequent to the at least one initialization cycle, automatically switching said receiver on during a first part corresponding to the time interval determined for the initialization cycle, in order to receive at least one authorization message packet intended for the group of mobile devices to which said mobile device belongs and automatically setting said receiver to a standby mode during a second part in which at least one authorization message packet intended for a group of mobile devices to which said mobile device does not belong is being transmitted; and
    processing by the mobile device, said messages received in the authorization message packets.

13. The system for processing authorization messages according to claim 12, wherein said mobile device receives only one authorization message packet per cycle and wherein only that packet is processed during each cycle.

14. The system fix processing authorization messages according to claim 12, wherein said receiver is set in standby mode when the packets of sent authorization messages are not part of the authorization message packets intended for said mobile device and wherein the standby mode setting is made on the basis of a time cycle and of an instant within the cycle, as of which the authorization message packet concerning said mobile device is sent.

15. A system for transmitting authorization messages destined for a plurality of mobile devices having receivers, the system comprising a management center configured to perform the steps of:
    defining at least one set of cyclical authorization messages, a first part of which, forming a first message category, is intended for a first group of mobile devices and a second part of which, forming a second message category, is intended for a second group of mobile devices, wherein the messages sent during one cycle are different from the messages of the same message category sent during a subsequent cycle;
    creating a first authorization message packet containing at least the said first part of the set of cyclical authorization messages;
    creating a second authorization message packet containing at least the said second part of the set of authorization messages, wherein at least one of the authorization message packets comprises at least two message categories;
    cyclically transmitting the said first authorization message packet over a first service, without previously sending information indicating to which mobile devices the message packets are directed; and
    cyclically transmitting the said second authorization message packet over a second service distinct from the said first service without previously sending information indicating to which mobile devices the message packets are directed.

16. The system for transmitting authorization messages according to claim 15, wherein the cyclical authorization messages are divided into several sets, each of them defining at least one category of authorization messages.

17. The system for transmitting authorization messages according to claim 16, wherein all or a part of the remaining authorization messages of the set are transmitted on at least a third service different from the first service and the second service.

18. The system for transmitting authorization messages according to claim 16, wherein the categories of authorization messages are defined on the basis of criteria linked with at least one parameter of the concerned mobile devices.

19. The system for transmitting authorization messages according to claim 18, wherein the parameter of the mobile devices is chosen among a group consisting of a type of mobile device, an identification number, a category of access rights of a mobile device, and a configuration version of said mobile device.

20. The stem for transmitting authorization messages according to claim 16, wherein the categories of authorization messages are defined on the basis of criteria linked simultaneously to the authorization message type and to the parameter linked to the concerned mobile devices.

21. The system for transmitting authorization messages according to claim 18, wherein the categories of authorization messages are defined on the basis of criteria linked simultaneously to the authorization message type and to the parameter linked to the concerned mobile devices.

22. The system for transmitting authorization messages according to claim 15, wherein at least one of the authorization messages packets comprise a single category of authorization messages.

23. The system for transmitting authorization messages according to claim 15, wherein at least one of the authorization message packets comprises several categories of authorization messages.

* * * * *